United States Patent [19]

Tsunoda et al.

[11] 4,085,423
[45] Apr. 18, 1978

[54] INFORMATION REPRODUCING APPARATUS WITH PLURAL BEAM READOUT

[75] Inventors: Yoshito Tsunoda, Mitaka; Takeshi Maeda, Kokubunji; Yoshitada Oshida, Sayama, all of Japan

[73] Assignee: Hitachi, Ltd., Japan

[21] Appl. No.: 691,099

[22] Filed: May 28, 1976

[30] Foreign Application Priority Data

Jun. 6, 1975 Japan .................. 50-67643

[51] Int. Cl.² ............................................. A04N 5/76
[52] U.S. Cl. ........................... 358/128; 179/100.3 V; 250/201
[58] Field of Search ............... 358/128, 130, 132, 127; 179/100.3 V, 100.3 K, 100.3 B, 100.3 R; 340/173 LM, 173 LT; 250/201, 226, 202

[56] References Cited

U.S. PATENT DOCUMENTS

| 3,624,278 | 11/1971 | Heckscher | 358/127 |
| 3,627,916 | 12/1971 | Bestenreiner | 179/100.3 V |
| 3,876,842 | 4/1975 | Bouwhuis | 179/100.3 V |
| 3,932,700 | 1/1976 | Snopko | 179/100.3 V |
| 3,969,575 | 7/1976 | Gerritsen | 250/201 |

OTHER PUBLICATIONS

"High-Resolution Graphics Using a HeCd Laser to Write on KALVAR film" by A. D. Berg et al; Journal of the SMPTE; Jul. 1974, vol. 83, p. 596.
"A Review of the MCA Disco-Vision System," Journal of the SMPTE; Jul. 1974; vol. 83, p. 555; by K. D. Broadbent.

*Primary Examiner*—Bernard Konick
*Assistant Examiner*—Alan Faber
*Attorney, Agent, or Firm*—Craig & Antonelli

[57] ABSTRACT

Information reproducing apparatus for producing information on an optical information recording medium includes a first light source which gives forth a beam of light of a wavelength $\lambda_1$ and a second light source which gives forth a beam of light of a wavelength $\lambda_2$ different from the wavelength $\lambda_1$. An optical element selectively reflects the light of the wavelength $\lambda_1$ and selectively transmits the light of the wavelength $\lambda_2$. The first and second light sources, the optical element and the recording medium are positionally arranged so that the light beams from the first and second light sources may be projected on a predetermined position of the recording medium and a substantially identical position to the predetermined position through the optical element, respectively, and the arrangement of these elements is also such that the respective projected light beams may fall on the optical element after being reflected by the recording medium. First and second photodetectors detect light reflected from the optical element and light transmitted light through the same in accordance with the wavelength of the light beams falling on the optical element, respectively, and develop focusing and tracking control signals.

14 Claims, 8 Drawing Figures

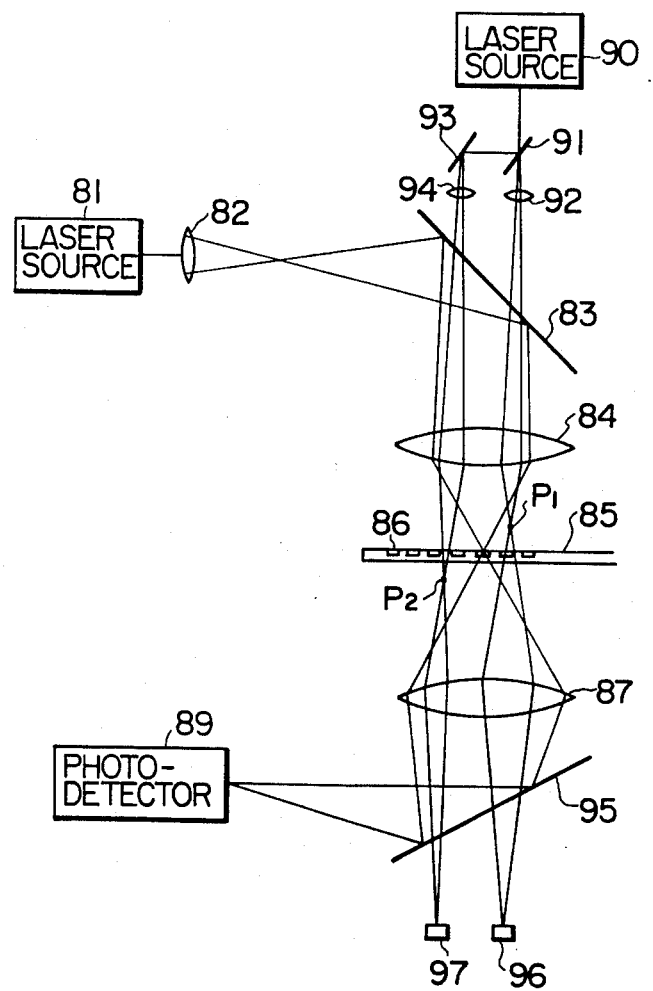

INFORMATION REPRODUCING APPARATUS WITH PLURAL BEAM READOUT

BACKGROUND OF THE INVENTION

This invention relates to information reproducing apparatus which employs a video disk or the like, and more particularly, to optical information reproducing apparatus which effects the reproduction of information with a plurality of light beams of different wavelengths.

Heretofore, information reproducing apparatus employing, for example, a video disk as an information recording medium has utilized a He – Ne laser as a light source for the reproduction of information from the disk. However, the He – Ne laser itself is quite expensive, so that the cost of the whole apparatus becomes unbearably high. Another disadvantage of such equipment is that, since the length of the laser is as great as 20 – 30 cm, it is virtually impossible to produce a compact form of this apparatus. A further disadvantage is that, since the information detection from the disk, the tracking and the auto-focusing are conducted with a single laser beam, the construction of the combination of optical systems for these operations becomes very complicated.

In order to solve the problems inherent in the prior art device, it has been proposed to adopt a semiconductor laser instead of the He – Ne laser. The mere substitution of the semiconductor laser for the He – Ne laser, however, results in the following problems. First of all, the laser power provided by the semiconductor laser is insufficient. In the second place, the disadvantage of the complicated optical system is not eliminated by the mere substitution of lasers.

There has been further prior art apparatus of the specified type, which is so constructed that an identical part of the information recording medium, or parts very close to each other, is illuminated with at least two light beams and the light reflected from the illuminated part or parts or transmitted therethrough is split into respective light beams for information detection, tracking and auto-focusing, the light beams being received by independent detectors.

SUMMARY OF THE INVENTION

It is an object of this invention to provide an information reproducing apparatus having a high light transmission efficiency.

Another object of this invention is to provide an information reproducing apparatus of small size and low cost.

Still another object of this invention is to provide an information reproducing apparatus having a simple optical system.

In order to accomplish such objects, this invention is directed to an arrangement in which a plurality of light beams of different wavelengths from at least two light sources are guided to an information recording medium through a wavelength selective optical element.

Hereunder, this invention will be described with reference to the drawing.

BRIEF DESCRIPTION OF THE DRAWING

FIGS. 7 and 8 are schematic diagrams each showing the construction of a still further embodiment of this invention.

DESCRIPTION OF THE PRIOR ART

Figure 1:
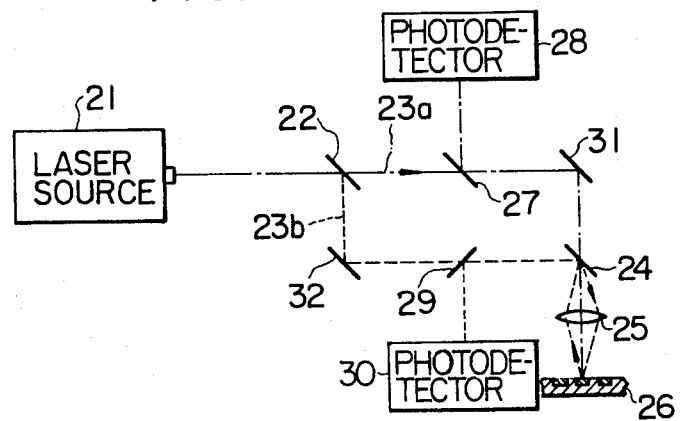
FIGS. 1 and 2 are schematic diagrams each showing the construction of prior art information reproducing apparatus.

FIG. 1 shows an example of one type of prior art apparatus. A laser beam emergent from a laser source 21 is divided or split into two laser beams 23a and 23b by a half-mirror (semi-transparent mirror) 22. The laser beam 23a permeates through a half-mirror 27, is reflected by a reflector 31, permeates through a half-mirror 24, and is focused by a lens 25 onto a video disk 26, which forms an information recording medium. Light reflected from the video disk retrocedes along the same optical path, is reflected by the half-mirror 27, and falls on a photodetector 28.

On the other hand, the other laser beam 23b is reflected by a reflector 32, permeates through a half-mirror 29, is reflected by the half-mirror 24, and is projected onto the video disk 26 via the lens 25. Light reflected from the video disk passes through the lens 25, is reflected by the half-mirror 24, is further reflected by the half-mirror 29, and falls on a photodetector 30.

In this case, the laser beams 23a and 23b are respectively used as light beams for performing the functions of information detection and tracking as well as the function of auto-focusing.

This example of the prior art has the disadvantage that, since the loss of light in the half-mirror 24 is very substantial, the light transmission efficiency of the system is low. Thus, there has been proposed apparatus, such as illustrated in FIG. 2, which, in order to eliminate this disadvantage, dispenses with the half-mirror 24.

Figure 2:
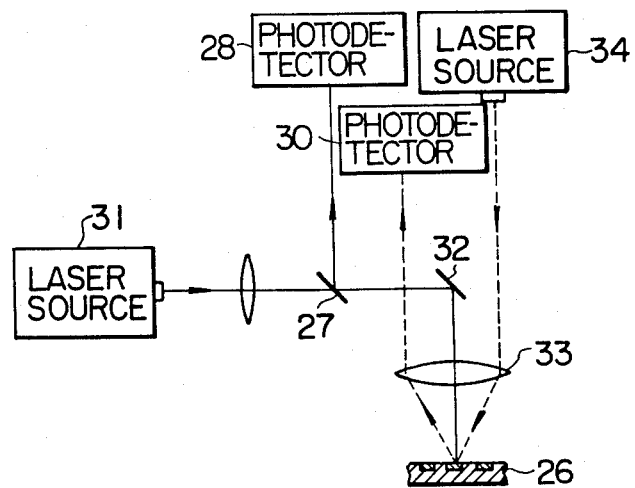

Referring to FIG. 2, a laser beam emergent from a first laser source 31 is reflected by a mirror 32 and is focused on the disk 26 by a lens 33. Reflected light retrocedes along the same optical path, is reflected by the half-mirror 27, and falls on the photodetector 28.

On the other hand, a laser beam emergent from a second laser source 34 is projected onto the video disk 26 via the lens 33. Reflected light falls on the photodetector 30 after passing back through the lens 33. In this case, the laser beams from the laser sources 31 and 34 effect information detection as well as tracking and auto-focusing, respectively.

With this construction, however, it is difficult to accurately determine the optical path for the respective laser beams so that the laser beam from the second laser 34 will not fall on and be intercepted by the mirror 32. In particular, in the case where the mirror 32 performs tracking, the optical path design becomes extremely difficult.

DESCRIPTION OF THE PREFERRED EMBODIMENTS

Figure 3:
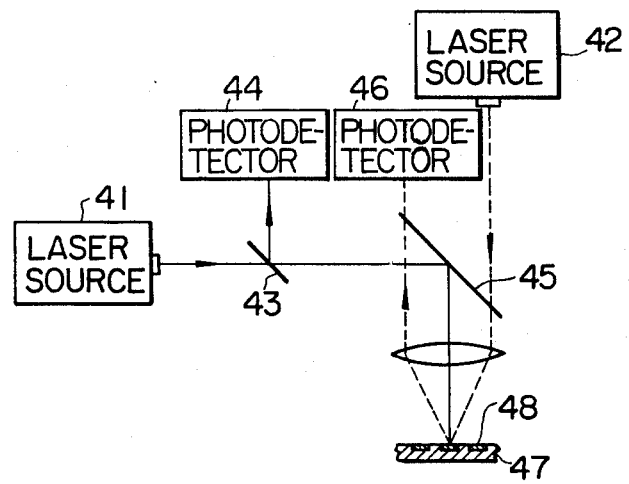
FIG. 3 is a schematic diagram showing the construction of an embodiment of this invention.

FIG. 3 is a diagram which shows the construction of an information reproducing apparatus according to an embodiment of this invention. In the figure, a first light source 41 produces a laser beam of a wavelength $\lambda_1$ and a second light source 42 produces a laser beam of a wavelength $\lambda_2$. A half-mirror (semitransparent mirror) 43 is provided along the path of the laser beam from the source 41. A wavelength selective optical element 45 is positioned to reflect the light beam of the wavelength $\lambda_1$ and transmits the light beam of the wavelength $\lambda_2$. The element 45 is, for example, a well-known dichroic mirror of the type commonly used as a galvanometer. A first photodetector 44 detects light reflected from half-mirror 43 for information detection and tracking, while a second photodetector 46 detects light for auto-focusing.

Numeral 47 represents an information recording medium which is, for example, a tape, a sheet or a video disk and on which an information track 48 is formed. According to such construction, the light beams of the wavelengths $\lambda_1$ and $\lambda_2$ as respectively emitted from the light sources 41 and 42 are conducted to the recording medium 47 through the dichroic mirror 45. Subsequently, they are reflected on the information track 48 of the recording medium 47. Of the reflected light beams, that having the wavelength $\lambda_1$ is reflected by the dichroic mirror 45 and the half-mirror 43 so as to come into incidence on the first photodetector 44. It is utilized for the reproduction (or reconstruction) of information recorded on the information track 48 and for subsequent control. On the other hand, the light beam of wavelength $\lambda_2$ is transmitted through the dichroic mirror 45 and comes into incidence on the second photodetector 46. It is utilized for the subsequent control of auto-focusing.

Such a construction is advantageous in that the transmission losses of the lights emitted from the respective light sources are reduced and the construction of the optical system is simplified.

Figure 4:
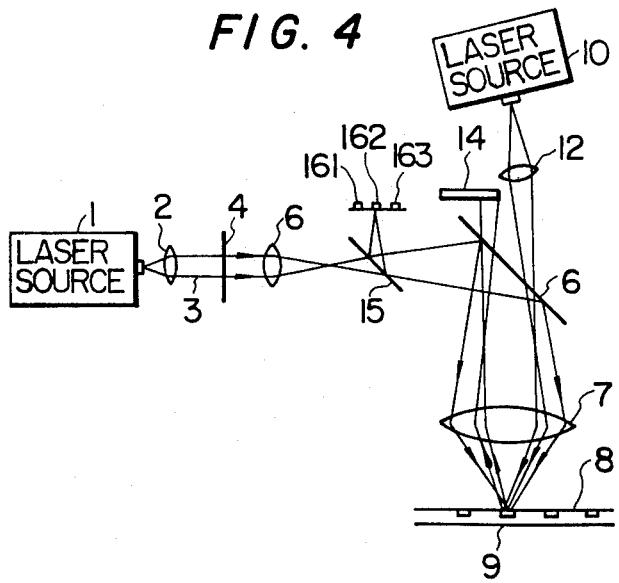
FIGS. 4 and 6 are schematic diagrams each showing the construction of further embodiments of this invention.

FIG. 4 is a diagram which shows the construction of another embodiment of this invention. In the illustrated case, information on a recording medium, for example, a video disk, is tracked by the use of three light beams. In the figure, a laser beam of wavelength $\lambda_1$ emergent from a semiconductor laser source 1 is formed into a collimated beam 3 by a lens 2 and is divided into three beams of light, one of order zero and two lights of orders (+) one and (−) one, respectively, by a diffraction grating 4. After passing through a lens 5, the respective light beams pass through a beam splitter 15, are reflected by a galvano-mirror 6, and are converged onto an information track 9 on a video disk 8 by a lens 7. Here, the galvano-mirror 6 is, of course, constructed by the use of a dichroic mirror having wavelength selectivity.

The light of order (+) one, the light of order zero, and the light of order (−) one as reflected from the information track 9 are reflected by the galvano-mirror 6 again, whereupon they are respectively guided to photodetectors 161, 162, and 163. In this case, an information signal is detected by the central photodetector 162, and a tracking signal is detected as a differential output between the end photodetectors 161 and 163, as will be explained below.

Figure 5:
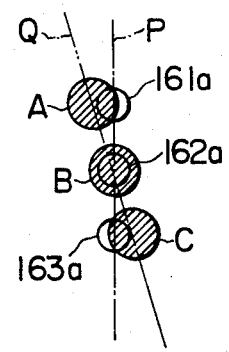
FIG. 5 is a diagram for explaining the embodiment shown in FIG. 4.

The relations between the photodetectors and the reflected light beams are illustrated in FIG. 5. Reference numerals 161a, 162a, and 163a indicate light entrance ports of the photodetectors 161, 162, and 163, respectively. Let it be supposed that the reflected beams A, B, and C of the light of order (+1), the light of order 0, and the light of order (−1) are projected onto the respective entrance ports 161a, 162, and 163a. That is, the letters A, B, and C denote spots of the respective beams.

In the case of the figure, a center line P coupling the centers of the light entrance ports of the photodetectors and a center line Q coupling the centers of the beam spots intersect at or near the light entrance port 162a of the central photodetector, and the beam spots A and C only partially intercept the light entrance ports 161a and 163a of the end photodetectors, respectively.

When, in FIG. 4, the information track 9 deviates leftwards or rightwards relative to its traveling direction (in a direction orthogonal to the drawing in the case of the figure), the center line Q of the beam spots in FIG. 5 moves leftwards or rightwards with respect to the center line P of the light entrance ports, and the outputs of the photodetectors 161 and 163 at the ends increase or decrease conversely to each other. The beams can therefore be always projected onto the information track in such a way that the deviation of the information track is detected on the basis of the differential output between the photodetectors 161 and 163 and the galvano-mirror 6 can be moved in correspondence therewith. Such a tracking method is described in detail in "Philips Technical Review", Vol. 33, page 178, 1973.

On the other hand, a light beam emergent from another light source 10 which contains a wavelength component $\lambda_2$ unlike the semiconductor laser 1 is directed to the galvano-mirror 6 by a lens 12. The light rays of the wavelength $\lambda_2$ are selected here, converged onto a focus of the lens 7 and projected onto the surface of the video disk 8. Subsequently, the light rays of the wavelength $\lambda_2$ are reflected by the surface of the video disk 8, directed to and transmitted through the galvano-mirror 6 and guided onto a position sensor 14.

When the position of the video disk 8 fluctuates upwards or downwards, the position of the reflected light beam on the position sensor 14 changes in correspondence with the fluctuation, and a defocusing signal is detected. The vertical movements of the disk can therefore be compensated by moving the lens 7 vertically on the basis of the defocusing signal. The controlled movement of the lens 7 is possible using a known voice coil, and hence, the details of such arrangement are omitted here.

By way of example, the galvano-mirror 6 exhibits a reflection factor of substantially 100% for the wavelength $\lambda_1$ of the semiconductor laser 1 and a reflection factor of substantially 0% for the wavelength $\lambda_2$ of the light source 10. That is, it falls into a state close to a reflector and a state close to a transmission plate in dependence on the wavelength. In accordance with the present invention, the mirror 6 is, for example, a dichroic mirror or it may be any other reflector having wavelength selectivity. Accordingly, the optical system of the semiconductor laser 1 and that of the light source 10 are mixed without incurring any light loss, and the light beams can be conducted to the video disk 8 by the single lens 7.

As the light source 10, there can be used, for example, a semiconductor laser or a light emitting diode which differs in wavelength from the semiconductor laser 1, or a source of white light. More specifically, the semiconductor laser 1 is employed for the detection of the information signal and the tracking signal because the beam should be sharply focused on the video disk 8 to the same extent as the width of the information track 9. On the other hand, in the optical system for auto-focusing, the diameter of the collimated beam on the video disk need not be so small, and hence, a light source other than the semiconductor laser may be employed. In this case, the light emitting diode is the most desirable element to be used as the light source 10. This is because it is comparatively high in efficiency and can be provided as a small-sized light source.

The wavelength selectivity of the dichroic mirror is as sharp as several tens A or less. Therefore, it suffices that the wavelength of the light source 10 differs by 100 – 200 A or more from that of the semiconductor laser 1.

It has been described above that the galvano-mirror 6 is constructed of a dichroic mirror which is used a wavelength selective element. In constructing the galvano-mirror 6, the dichroic mirror may be formed on a support, such as a transparent plate of glass, for example, or it may be formed on a support, such as a prism or the like. Further, where the wavelength selective film itself has a sufficient hardness or rigidity, the support is unnecessary.

In accordance with the embodiment shown in FIG. 4, the whole optical system can be made compact and inexpensive as compared with the prior-art examples. Further, in comparison with the prior art example in FIG. 1, the transmission loss by the half-mirror 24 is not involved, and the light transmission efficiency can be enhanced by four times or so in the reciprocation.

Figure 6:
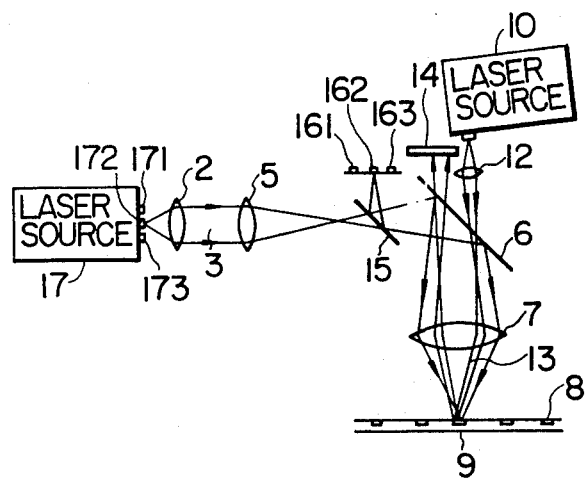

Reference is now had to FIG. 6 which shows another embodiment of this invention. In the figure, a semiconductor laser 17 has three light emitting sources 171, 172, and 173. A light beam from each source is formed into a collimated beam 3 by a lens 2, and the collimated beam passes through a lens 5. The succeeding construction is the same as in the embodiment of FIG. 4. That is, in the embodiment shown in FIG. 4, the three laser beams formed of the light of order 0 and the lights of orders ($\pm$ 1) are obtained from the single laser beam by the use of a diffraction grating so as to utilize the laser beams for information signal detection, tracking and auto-focusing. In contrast, in the present invention, three independent semiconductor laser sources are adopted. As the light source 10 for the auto-focusing, there is used a light emitting diode or a white light source.

Also in the embodiment of FIG. 6, the tracking signal is acquired on the basis of the differential output between the detectors 161 and 163. Thus, the tracking is carried out by moving the laser 17 in a direction orthogonal to the optical axis or by swinging the galvano-mirror 6. The auto-focusing is carried out in such a way that the output of the position sensor 14 is applied to a voice coil so as to raise or lower the lens 7.

As a modification of the respective embodiments shown in FIGS. 4 and 6, a sensor for detecting light flux density can be employed instead of the position sensor 14.

Figure 7:
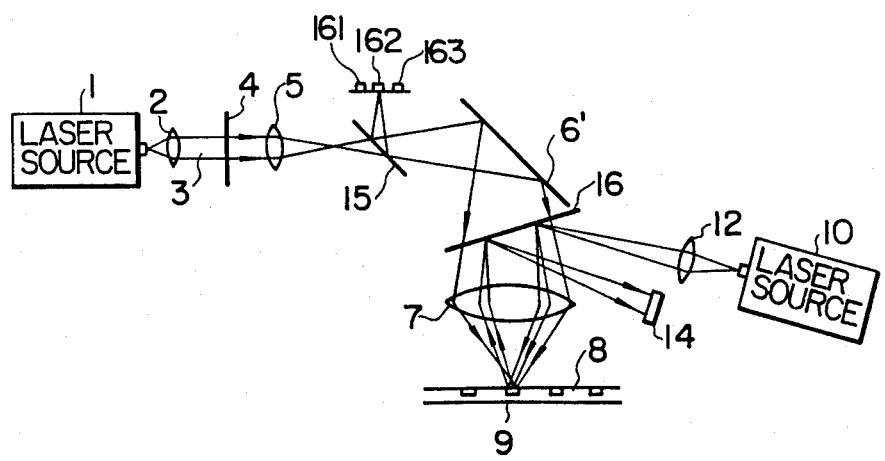

While, in the embodiments of FIGS. 4 and 6, the galvano-mirror is constructed of a dichroic mirror, it is a matter of course that similar effects can be achieved even when the dichroic mirror and the galvano-mirror are individually provided. FIG. 7 shows an embodiment in which the galvano-mirror and the dichroic mirror are separately disposed. In the figure, the same symbols as in FIG. 4 designate the same or equivalent parts. Symbol 6' indicates a galvano-mirror which is made of an ordinary reflector. Accordingly, the dichroic mirror 16 shown in FIG. 7 and that shown in FIG. 4 exhibit reverse wavelength selectivities for the wavelength $\lambda_1$ and the wavelength $\lambda_2$.

While the above description has been made of the case where a wavelength selective element is used for the information reconstructing apparatus employing a reflection type of information recording medium, this invention is not restricted thereto, but it is also applicable to the case where a transmission type information recording medium is employed.

FIG. 8 is a diagram which shows the construction of an embodiment of the invention applicable to the case of a transmission type recording medium. In the figure, a laser beam of a wavelength $\lambda_1$ emitted from a laser source 81 is projected onto a galvanometer 83 through a lens 82. As in the case where the reflection type video disk is employed, the galvanometer 83 is constructed of a dichroic mirror. The light beam reflected by the galvanometer 83 is converged onto a transmission type video disk 85 by a focusing lens 84. That is, the light beam of wavelength $\lambda_1$ permeates through the video disk 85 and is directed towards a lens 87 after it has converged onto an information track 86 on the transmission type video disk 85. The light beam of the wavelength $\lambda_1$ passes through the lens 87 and is reflected by a dichroic mirror 95. The reflected light beam comes into incidence on a photodetector 89.

As in the case of the reflection type video disk, the reconstruction of information and the tracking thereof are executed on the basis of an electric output of the photodetector 89 by a method which is well known. On the other hand, a laser beam of a wavelength $\lambda_2$ emitted from a laser source 90 is divided into two beams by a beam splitter 91. One of the beams proceeds towards 92, while the other is reflected by a mirror 93 and proceeds towards a lens 94. Here, the lenses 92 and 94 have focal distances different from each other. The focus of the lens 92 is situated at $P_1$ on the light incidence side of the transmission type video disk 85 (above the video disk 85 in the figure), whereas the focus of the lens 94 is situated at $P_2$ on the light transmission side of the video disk 85 (below the video disk 85 in the figure). Moreover, the foci $P_1$ and $P_2$ are equally distant from the video disk 85.

The light beams of the wavelength $\lambda_2$ as have respectively passed through the lenses 92 and 94 of the different focal lengths pass through the galvanometer 83 and proceed towards the focusing lens 84. Accordingly, the dichroic mirror constituting the galvanometer 83 provides the wavelength selectivity of reflecting the light of the wavelength $\lambda_1$ and transmitting the light of the wavelength $\lambda_2$. The light beams of the wavelength $\lambda_2$ having passed through the focusing lens 84 are converged onto the video disk 85. When the light beams of the wavelength $\lambda_2$ are converged on the video disk 85, the light diffraction arising is the greatest. When the light beams of the wavelength $\lambda_2$ are not converged on the video disk 85, that is, when they are out of focus, the light diffraction is not great and the photodetectors 96 and 97, which receive the light beams of the wavelength $\lambda_2$, provide output signals of different magnitudes. Control may therefore be provided by moving the focusing lens 84 with a voice coil or the like until the difference is reduced to zero. Such means for effecting moving control of the focusing lens 84 is well known.

The light beams of the wavelength $\lambda_2$ having permeated through the video disk 85 pass through the lens 87, permeate through the dichroic mirror 95 and fall on the photodetectors 96 and 97. Thus, the foregoing electric signals for controlling the position of the focusing lens 84 are obtained. Accordingly, the dichroic mirror 95, which is fixed in position provides wavelength selectivity by reflecting the light beam of wavelength $\lambda_1$ and transmitting the light beams of wavelength $\lambda_2$. When the video disk 85 deviates onto the side of the focus $P_1$, the output signal from the photodetector 96 decreases, and when it deviates onto the side of the focus $P_2$, the output signal from the photodetector 97 decreases.

As set forth above, according to this invention, the optical system of the prior art information reproducing apparatus can be made compact in construction, low in cost and small in the light transmission loss. Besides, the invention is greatly effective for putting into practical use the information reproducing apparatus employing a semiconductor laser.

What is claimed is:

1. Information reproducing apparatus comprising:
   first light source means for producing a first light beam having a predetermined wavelength,
   second light source means for producing a second light beam having a wavelength different from that of said first light beam,
   a recording medium having an information track,
   an optical system including first means for conducting said first and second light beams to said information recording medium and wavelength selective optical means mounted for movement to follow said track and positioned in the paths of said first and second light beams for reflecting said first light beam and transmitting said second light beam,
   a first detector positioned to receive the first light beam reflected by said information recording medium after being again reflected by said wavelength selective optical means, and
   a second detector positioned on the opposite side of said wavelength selective optical means from said information recording medium to receive the second light beam reflected by said information recording medium after being again transmitted through said wavelength selective optical means.

2. The information reproducing apparatus according to claim 1, wherein at least one of said first and second light source means is a laser source.

3. The information reproducing apparatus according to claim 1, wherein said information recording medium is a video disk.

4. The information reproducing apparatus according to claim 1, wherein said wavelength selective optical means is a dichroic mirror.

5. The information reproducing apparatus according to claim 1, further including means to split said first light beam into a plurality of light beams interposed between said first light source means and said optical system.

6. The information reproducing apparatus according to claim 5, wherein said beam splitting means is a diffraction grating.

7. The information reproducing apparatus according to claim 5, wherein said first detector includes means for individually detecting each of said plurality of light beams into which said first light beam is split.

8. Information reproducing apparatus comprising:
   first light source means for producing a first light beam having a predetermined wavelength,
   second light source means for producing a second light beam having a wavelength different from that of said first light beam,
   a recording medium having an information track arranged in the optical paths of said first and second light beams,
   a first optical system including first means for conducting said first and second light beams to said information recording medium and first wavelength selective optical means mounted for movement to follow said track and positioned in the paths of said first and second light beams on one side of said information recording medium for reflecting said first light beam and transmitting said second light beam on the basis of the wavelength thereof,
   a second optical system including second means for conducting said first and second light beams from said information recording medium after passage therethrough and second wavelength selective optical means positioned in the paths of said first and second light beams on the other side of said information recording medium for reflecting said first light beam and transmitting said second light beam,
   a first detector has been added, for developing a tracking control signal, positioned to receive the first light beam transmitted through said information recording medium after being reflected by said second wavelength selective optical means, and
   a second detector, for developing a focus control signal, positioned to receive the second light beam transmitted through said information recording medium after being transmitted through said second wavelength selective optical means.

9. The information reproducing apparatus according to claim 8, wherein at least one of said first and second light source means is a laser source.

10. The information reproducing apparatus according to claim 8, wherein said information recording medium is a video disk.

11. The information reproducing apparatus according to claim 8, wherein at least one of said first and second wavelength selective optical means is a dichroic mirror.

12. The information reproducing apparatus according to claim 8 wherein said first means includes beam splitter means for splitting said second light beam into a pair of second light beams of the same wavelength and a pair of lenses for conducting respective ones of said pair of second light beams to said information recording medium, said pair of lenses having respectively different focal lengths.

13. The information reproducing apparatus according to claim 12 wherein said second detector includes means for individually detecting said pair of second light beams after passage through said information recording medium.

14. The information reproducing apparatus according to claim 13 wherein the focus of one of said pair of lenses lies on one side of said information recording medium and the focus of the other one of said pair of lenses lies on the other side of said information recording medium.

* * * * *